(12) United States Patent
Chen et al.

(10) Patent No.: US 11,228,203 B2
(45) Date of Patent: Jan. 18, 2022

(54) AUTOMATIC AC FEED CONTROL (AFC) WITH ZERO VOLTAGE/CURRENT SWITCHING

(71) Applicant: Flex Ltd., Singapore (SG)

(72) Inventors: WeiAn Chen, Shenzhen (CN); HuaMin Xu, Shenzhen (CN)

(73) Assignee: Flex Ltd, Singapore (SG)

( * ) Notice: Subject to any disclaimer, the term of this patent is extended or adjusted under 35 U.S.C. 154(b) by 122 days.

(21) Appl. No.: 16/802,020

(22) Filed: Feb. 26, 2020

(65) Prior Publication Data
US 2020/0280208 A1  Sep. 3, 2020

Related U.S. Application Data

(60) Provisional application No. 62/812,564, filed on Mar. 1, 2019.

(51) Int. Cl.
*H02J 9/06* (2006.01)
*H02M 1/42* (2007.01)

(52) U.S. Cl.
CPC .......... *H02J 9/061* (2013.01); *H02J 9/068* (2020.01); *H02M 1/4225* (2013.01)

(58) Field of Classification Search
CPC ......... H02J 9/061; H02J 9/068; H02M 1/4225
See application file for complete search history.

(56) References Cited

U.S. PATENT DOCUMENTS

| | | |
|---|---|---|
| 5,594,629 A | 1/1997 | Steigerwald |
| 5,745,358 A | 4/1998 | Faulk |
| 5,973,939 A | 10/1999 | Tan |
| 5,977,530 A | 11/1999 | Bessho et al. |
| 2001/0022732 A1 | 9/2001 | Yasmura |
| 2002/0097589 A1 | 7/2002 | Jansen et al. |
| 2004/0062061 A1 | 4/2004 | Bourdillon et al. |
| 2005/0270001 A1 | 12/2005 | Jitaru et al. |
| 2007/0058406 A1 | 3/2007 | Inoshita |
| 2007/0263415 A1 | 11/2007 | Jansen |
| 2010/0110732 A1 | 5/2010 | Moyer et al. |
| 2010/0284203 A1 | 11/2010 | Moussaoui |
| 2014/0183956 A1* | 7/2014 | Wang ............... H02J 9/062 307/64 |
| 2015/0155669 A1 | 6/2015 | Chamberlain |
| 2018/0164355 A1 | 6/2018 | Winkler |

FOREIGN PATENT DOCUMENTS

DE  69400222  11/1996

OTHER PUBLICATIONS

First action dated Apr. 29, 2020, Chinese Patent Application No. 2018108146828, Applicant: Flextronics AP, LLC., 23 pages.
English Translation of the Second Office Action Application No. 201810814682.8, Applicant: Flextronics AP, LLC.,24 pages.

* cited by examiner

*Primary Examiner* — Carlos Amaya
(74) *Attorney, Agent, or Firm* — Haverstock & Owens LLP

(57) ABSTRACT

A power converter with AFC (Automatic AC Feed Control) implements zero voltage switching when switching from a first input power supply to a second input power supply. The power converter with AFC includes a relay switchover circuit and control circuitry for selectively providing power to a connected power converter. The control circuitry uses sensed amplitude and phase values for the two input power supplies for determining when the first input power supply is lost and selectively connecting the second input power supply according to precise timing control to minimize component stress.

11 Claims, 4 Drawing Sheets

AUTOMATIC AC FEED CONTROL (AFC) WITH ZERO VOLTAGE/CURRENT SWITCHING

RELATED APPLICATIONS

This patent application claims priority under 35 U.S.C. 119(e) of the co-pending U.S. provisional patent application, Application Ser. No. 62/812,564, filed on Mar. 1, 2019, and entitled "Automatic AC Feed Control (AFC) with Zero Voltage/Current Switching", which is hereby incorporated in its entirety by reference. This patent application claims priority of the co-pending Chinese patent application, Application Serial No. 202010090181.7, filed on Feb. 13, 2020, and entitled "Automatic AC Feed Control (AFC) with Zero Voltage/Current Switching", which is hereby incorporated in its entirety by reference.

FIELD OF THE INVENTION

The present invention is generally directed to power converters having relay switches. More specifically, the present invention is directed to automatic ac feed control (AFC) with zero voltage/current switching in power converters having relay switches.

BACKGROUND OF THE INVENTION

In many power required applications, such as data centers having multiple servers, multiple power sources are used. For example, a first power supply is actively connected to the load while a second power supply functioning as a back-up is disconnected. Whether connected or disconnected, both power supplies are powered on. In the case where the first power supply is interrupted, the first power supply is disconnected from the load and the second power supply is actively connected. Typically, relay switches are used to physically switch the load from the first power supply to the second power supply.

Problems arise in switching from the first power supply to the second power supply. The relay switches used to switch from the first power supply to the second power supply are mechanical switches that use a switching arm that moves from a first terminal to a second terminal. If current provided by the second power supply is present at the relay switches at switchover, there may be sparking. This also results in component stress, both of which are undesirable.

SUMMARY OF THE INVENTION

Embodiments are directed to a power converter with AFC (Automatic AC Feed Control) for implementing zero voltage switching when switching from a first input power supply to a second input power supply. The power converter with AFC includes a relay switchover circuit and control circuitry for selectively providing power to a connected power converter. The control circuitry uses sensed amplitude and phase values for the two input power supplies for determining when the first input power supply is lost and selectively connecting the second input power supply according to precise timing control to minimize component stress.

In an aspect, a power supply and power converter system is disclosed. The system comprises a first input AC power supply, a second input AC power supply, a relay switchover circuit, a power conversion circuit, a voltage sensing circuit, and a control circuit. The relay switchover circuit is coupled to the first input AC power supply and a second input AC power supply. Under normal operating conditions the relay switchover circuit is configured to enable connection with the first input AC power supply and disable connection from the second input AC power supply. The power conversion circuit is coupled to the relay switchover circuit. The voltage sensing circuit is coupled to the first input AC power supply and the second input AC power supply. The control circuit is coupled to the voltage sensing circuit, the relay switchover circuit, and the power conversion circuit. The control circuit is configured to receive sensed voltage levels of the first input AC power supply and the second input AC power supply, to determine if the first input AC power supply is interrupted and switchover to the second input AC power supply is required, and to control switchover of the relay switchover circuit to disable connection with the first input AC power supply and enable connection with the second input AC power supply at a zero voltage crossing of the sensed voltage level of the second input AC power supply. In some embodiments, the power conversion circuit comprises a main switch, and the control circuit is configured to transmit a control signal to the main switch such that the main switch is OFF at the zero voltage crossing. In some embodiments, the power conversion circuit comprises a power factor correction (PFC) power converter. In some embodiments, the power conversion circuit further comprises a DC-to-DC converter coupled to an output of the PFC power converter. In some embodiments, the PFC power converter is a boost converter. In some embodiments, the control circuit comprises a first control circuit for providing control signals to the relay switchover circuit and a second control circuit for providing control signals to the PFC power converter, wherein the system further comprises an isolation barrier between the first control circuit and the second control circuit. In some embodiments, the first control circuit is configured to provide control signals to the second control circuit through the isolation barrier. In some embodiments, the control circuit is configured to determine if switchover to the second input AC power supply is required by determining if the sensed voltage value of the first input AC power supply is zero for a predetermined waiting period. In some embodiments, the control circuit is configured to control switchover of the relay switchover circuit by calculating a next zero voltage crossing time of the second input AC power supply immediately following the predetermined waiting period, and then transmitting a control signal to the relay switchover circuit at a time equal to the calculated next zero voltage crossing time minus a predetermined switching delay time period. In some embodiments, the control circuit is further configured to transmit a second control signal to a main switch of the power conversion circuit prior to the next zero voltage crossing time, wherein the second control signal turns OFF the main switch such that the main switch is OFF at the switchover of the relay switchover circuit.

In another aspect, a method of switching over power supplies for a power converter is disclosed. The method comprises coupling a first input AC power supply and a second input AC power supply to a relay switchover circuit, wherein under normal operating conditions the relay switchover circuit is configured to enable connection of the first input AC power supply to a power conversion circuit and disable connection of the second input AC power supply to the power conversion circuit. The method further comprises sensing a voltage level of the first input AC power supply and the second input AC power supply. The method further comprises determining if the first input AC power supply is interrupted and switchover to the second input AC power supply is required. The method further comprises controlling switchover of the relay switchover circuit to disable connection with the first input AC power supply and enable connection with the second input AC power supply at a zero voltage crossing of the sensed voltage level of the second input AC power supply. In some embodiments, the power conversion circuit comprises a main switch, and the method further comprises transmitting a control signal to the main switch such that the main switch is OFF at the zero voltage crossing. In some embodiments, determining if switchover to the second input AC power supply is required comprises determining if the sensed voltage value of the first input AC power supply is zero for a predetermined waiting period. In some embodiments, controlling switchover of the relay switchover circuit comprises calculating a next zero voltage crossing time of the second input AC power supply immediately following the predetermined waiting period, and then transmitting a control signal to the relay switchover circuit at a time equal to the calculated next zero voltage crossing time minus a predetermined switching delay time period. In some embodiments, the method further comprises transmitting a second control signal to a main switch of the power conversion circuit prior to the next zero voltage crossing time, wherein the second control signal turns OFF the main switch such that the main switch is OFF at the switchover of the relay switchover circuit.

BRIEF DESCRIPTION OF THE DRAWINGS

Several example embodiments are described with reference to the drawings, wherein like components are provided with like reference numerals. The example embodiments are intended to illustrate, but not to limit, the invention. The drawings include the following figures.

DETAILED DESCRIPTION OF THE EMBODIMENTS

Embodiments of the present application are directed to a relay switchover control. Those of ordinary skill in the art will realize that the following detailed description of the relay switchover control is illustrative only and is not intended to be in any way limiting. Other embodiments of the relay switchover control will readily suggest themselves to such skilled persons having the benefit of this disclosure.

Reference will now be made in detail to implementations of the relay switchover control as illustrated in the accompanying drawings. The same reference indicators will be used throughout the drawings and the following detailed description to refer to the same or like parts. In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Figure 1:
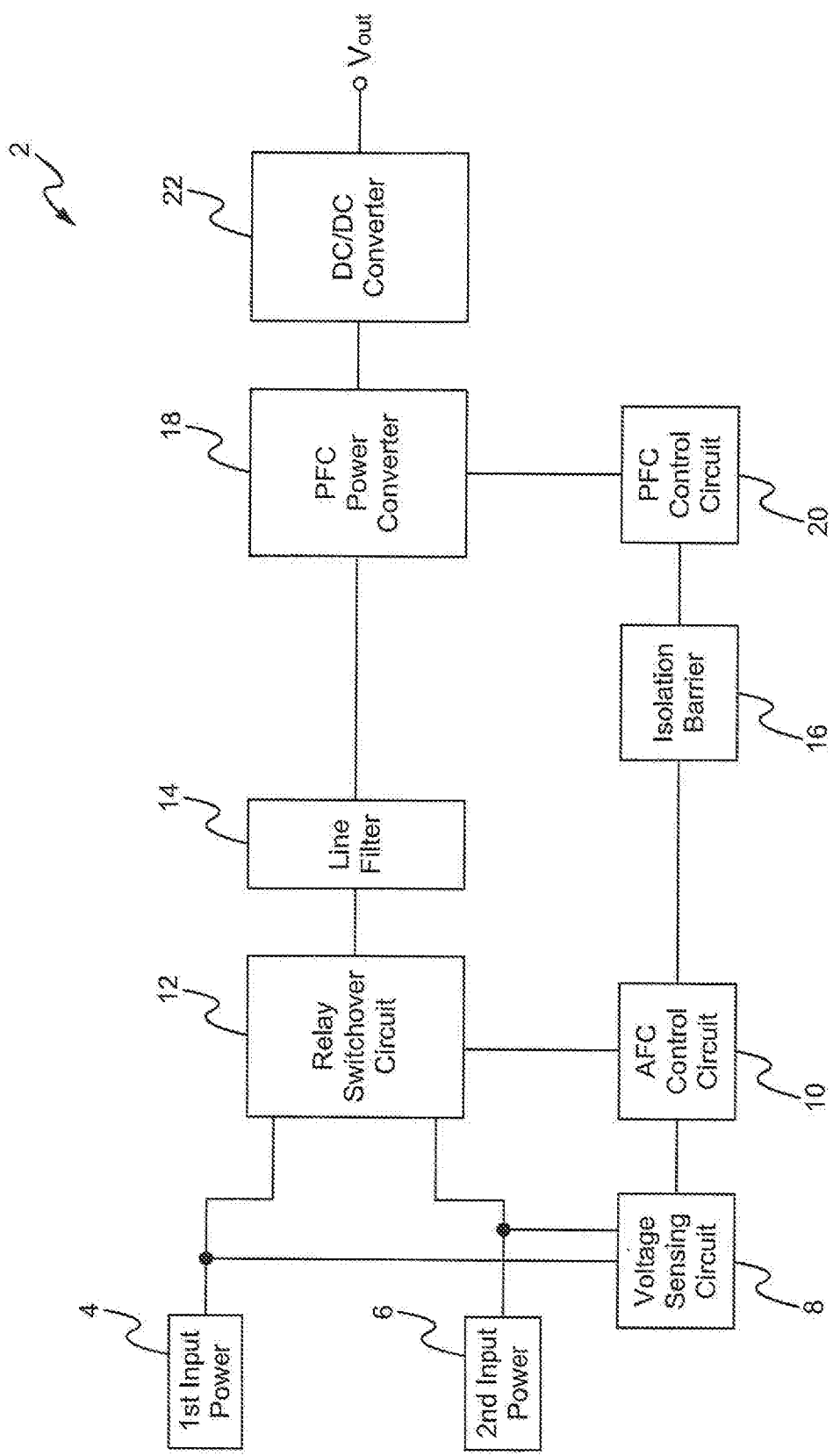
FIG. 1 illustrates a functional block diagram of the power converter with AFC according to some embodiments.

FIG. 1 illustrates a functional block diagram of the power converter with AFC according to some embodiments. The power converter with AFC 2 includes a first input power 4 and a second input power 6. The first input power 4 and the second input power 6 can be any conventional power sources, such as a main power grid and a back up generator, respectively. Each of the first input power 4 and the second input power 6 is coupled to a relay switchover circuit 12. The relay switchover circuit 12 is configured to selectively connect either the first input power 4 or the second input power 6 to a remainder of the power converter. In normal operation, the first input power 4 is connected to the remainder of the power converter. A line filter 14 is coupled to the relay switchover circuit 12. The line filter 14 can be any conventional filtering circuit, such as a circuit for filtering EMI (electromagnetic interference). The line filter 14 is coupled to a PFC (power factor correction) power converter 18, which is coupled to a DC-to-DC converter 22. An output of the DC-to-DC converter 22 provides an output voltage Vout of the power converter with AFC 2. A voltage sensing circuit 8 is coupled to the first input power 4 and to the second input power 6. The voltage sensing circuit 8 is configured to sense a voltage level of the first input power 4 and to sense a voltage level of the second input power 6, and to output the sensed voltage levels to an AFC control circuit 10. The AFC control circuit 10 is configured to control the relay switchover circuit 12 to selectively connect either the first input power 4 or the second input power 6 to the remainder of the power converter. A PFC control circuit 20 is coupled to the PFC power converter 18. The PFC control circuit 20 is configured to control the PFC power converter 18. The AFC control circuit 10 and the PFC control circuit 20 are coupled to provide control signaling across an isolation barrier 16. The AFC control circuit 10 and the PFC control circuit 20 are separated by an isolation barrier 16 to enable separate grounding for the voltage sensing circuit 8. The isolation barrier 16 can be a transformer, a capacitor, or other type of conventional isolation barrier. In some embodiments, an optical coupler is used to transmit the control signaling across the isolation barrier 16. It is understood that any alternative conventional signaling means capable of transmitting control signals across the isolation barrier can be used.

Figure 2:
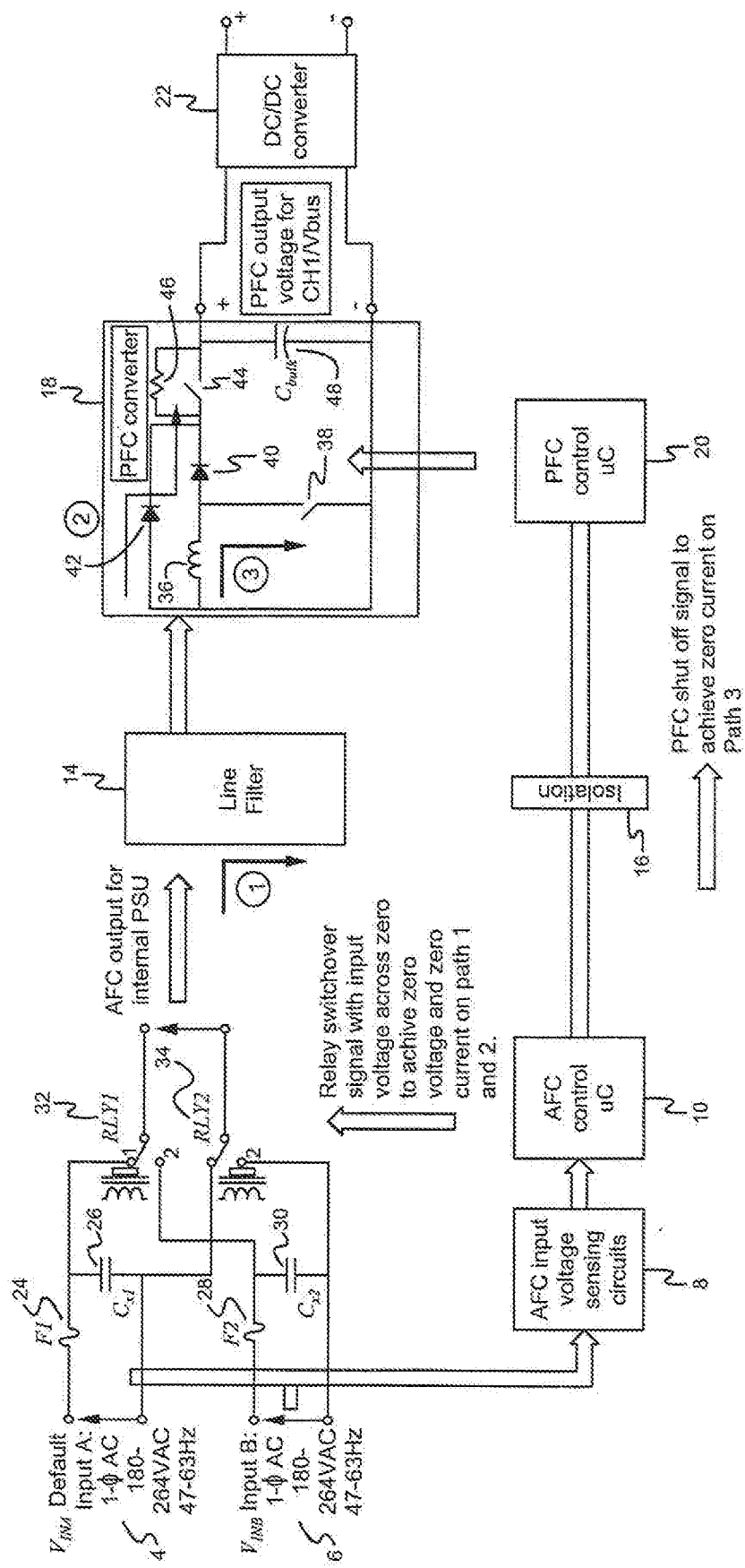
FIG. 2 illustrates a schematic block diagram of the power converter with AFC according to some embodiments.

Operation of the power converter with AFC 2 is described in greater detail in reference to the exemplary implementation of FIG. 2. FIG. 2 illustrates a schematic block diagram of the power converter with AFC according to some embodiments. The power converter with AFC shown in FIG. 2 is conceptually the same as the power converter with AFC of FIG. 1. The power converter with AFC shown in FIG. 2 shows an exemplary implementation of the power converter with AFC of FIG. 1, including schematic diagrams of select functional blocks. The system includes two input power sources, which provide an input voltage VinA corresponding to the first input power 4 and an input voltage VinB corresponding to the second input power 6. In an exemplary implementation, the first input power is an AC voltage source operating in a voltage range 180-264 VAC and a frequency range 47-63 Hz. Although the system shown and described is directed to two power supplies, it is understood that additional power supplies can also be included. The input power supplies are connected to the power converter by the relay switchover circuit 12 (FIG. 2). In some embodiments, the relay switchover circuit 12 includes two relay switches, a relay switch 32 and a relay switch 34. It is understood that additional relay switches can be used and configured to accommodate alternative input power supply configurations and a number of input power supplies greater than the two shown and described. In some embodiments, each input power supply is connected to corresponding relay switch via a fuse and a smoothing capacitor. In the exemplary configuration shown in FIG. 2, a fuse 24 and a smoothing capacitor 26 are coupled between the first input power 4 and the relay switch 32, and a fuse 28 and a smoothing capacitor 30 are coupled between the second input power 6 and the relay switch 34.

Each relay switch 32, 34 is a mechanical switch that includes a first terminal and a second terminal, and also includes a switching arm. In a first position, the switching arm is connected to the first terminal. In a second position, the switching arm is connected to the second terminal. The first position is considered the static state, or home position. In some embodiments, each relay switch 32, 34 is a magnetic relay switch that uses a magnet to move the switching arm from the first position to the second position. The magnetic relay switch also includes an inductor coil. When current is supplied through the inductor coil a magnetic field is induced that moves the magnet which in turn moves the switching arm from the first position to the second position. When the current is removed from the inductor coil, the magnetic field is no longer present, and the magnet returns to its stable position and the switching arm returns to the first position, such as by a spring. In this embodiment, the magnetic relay switches are controlled by the AFC control circuit 10 by controlling a current flow through the inductor coil of each relay switch. When there is current flow through the inductor coil, the switching arm of the relay switch is connected to the second terminal. When no current flow is present, the switching arm is connected to the first terminal It is understood that other types of relay switches can be used which are controllable by the AFC control circuit 10. As shown in FIG. 2, each of the relay switches 32, 34, are in the static state with the switching arm positioned against the first terminal. During normal operation of the power converter with AFC, the relay switches 32, 34 are each in the static state, which enables connection with the first input power 4.

A top terminal of the first input power 4 is connected to the first terminal of relay switch 32, and a top terminal of the second input power 6 is connected to the second terminal of relay switch 32. A bottom terminal of the first input power 4 is connected to the first terminal of relay switch 34, and a bottom terminal of the second input power 6 is connected to the second terminal of relay switch 34. To connect the first input power 4 to the power converter, the relay switch 32 is connected at the first terminal of relay switch 32 and the relay switch 34 is connected at the first terminal of relay switch 34, as shown in FIG. 2. To connect the second input power 6 to the power converter, the switching arm of the relay switch 32 is connected at the second terminal of relay switch 32 and the switching arm of the relay switch 34 is connected at the terminal 2 of relay switch 34.

The exemplary PFC power converter 18 is configured as a boost converter and includes a boost inductor 36, a main switch 38, a diode 40, a secondary switch 44, an in-rush resistor 46, a bulk capacitor 48, and a bypass circuit path including a diode 42. An output voltage of the PFC power converter 18 is the voltage across the bulk capacitor 48. In order for the boost converter to function properly, the output voltage must be higher than the input voltage. However, during power up there is zero output voltage, so at this point the output voltage is less than the input voltage. The bypass circuit path is automatically enabled anytime the input voltage is greater than the output voltage because under this condition the diode 42 is forward biased. The bypass circuit path is automatically disabled anytime the output voltage is greater than the input voltage because under this condition the diode 42 is reverse biased. The bypass circuit path is used to charge the bulk capacitor 48 (output voltage) before the main circuit path is enabled. Once the bulk capacitor 48 is charged to a point where the output voltage is greater than the input voltage, the diode 42 in the bypass circuit path becomes reverse biased and current stops flowing through the bypass circuit path, and the main circuit path is enabled by switching the main switch 38 ON and OFF. The circuit diagram for the PFC power converter 18 shown in FIG. 2 is for exemplary purposes only. It is understood that other circuit configurations can be used. It is also understood that the power converter in general can be of alternative types other than a boost converter.

Although not shown in FIG. 2, the DC-to-DC converter 22 includes an isolation barrier to provide electrical isolation between the PFC power converter 18 and the output voltage Vout. In some embodiments, the isolation barrier includes a transformer having a primary winding coupled to the PFC power converter 18 and a secondary winding coupled to circuit output Vout.

There are three current paths through the power converter with AFC 2. A first current path includes current flow through the relay switches 32, 34 and the line filter 14. A second current path is on the secondary side of the isolation barrier and includes current flow through the bypass circuit path having the diode 42. A third current path includes current flow through the boost inductor 36 and the main switch 38 or the diode 40 depending on whether the main switch 38 is ON or OFF. The third current path is the main current path through the PFC power converter 18. After power up, current flows through the third current path to charge the boost inductor 36. Current flows through the third current path according to control of the main switch 38 by the PFC control circuit 20. When the main switch 38 is closed (ON), current flows through the boost inductor 36 and the main switch 38 which charges the boost inductor 36, while the output voltage Vout is supplied by charge already stored in the bulk capacitor 48. When the main switch is open (OFF), current flows through the boost inductor 36 and the diode 40 and is supplied to both the bulk capacitor 48 and the DC-to-DC converter 22 to provide the output voltage Vout.

During operation, if the first power input 4 is interrupted or lost, load is still connected to the output of the power converter. In this case, the load draws current from the charged bulk capacitor 48 which drops the voltage across the bulk capacitor 48, which is also the voltage output from the PFC power converter 18. When the power supply is switched to the second power input 6, the voltage at the input of the PFC converter 18 may be larger than the drawn down voltage across the bulk capacitor 48 depending on the instantaneous AC voltage level of the second power input 6 at the time of the relay switchover, in which case, the bypass diode 42 is forward bias thereby automatically enabling the bypass circuit path (second current path).

An objective of the power converter with AFC is to establish zero current through the power converter and perform switchover of the relay switches during the zero current condition, which can be achieved by precise timing of the relay switches switchover at a zero voltage crossing of the second input power. Zero voltage timing of the second input power and timing for zero voltage switching of the relay switches is determined and implemented to minimize, if not eliminate, sparking at the relay switches. The lower the amount of sparking, the lower the stress on the relay switches. In conventional configurations, relay switches are switched from a first input power supply to a second input power supply without consideration for the value of the current through the power converter or the zero voltage switching relative to the second input power.

To establish zero current through the power converter with AFC 2, there must be zero current through each of the three current paths during relay switchover. Regarding the first current path, there is no active control in the line filter 14 because the line filter 14 only includes passive components, such as inductors and capacitors. To control the current flow in the first current path, zero voltage switching relative to the second input power 6 is implemented. If there is zero input voltage, then there is zero input current, which results in zero current through first current path. Regarding the second current path, switchover is implemented at a zero voltage crossing of the second input power 6. If switchover occurs at such a zero voltage crossing, then at this instant the buck voltage (output of PFC power converter 18) is higher than the voltage input to the PFC power converter 18, which means the diode 42 is reverse biased and no current flows through the second current path. Therefore, zero current through the first and second current paths can be achieved by making sure the relay switchover occurs at a zero voltage crossing of the second input power 6. Regarding the third current path, this is controllable by turning OFF the main switch 38 by the PFC control circuit 20. Prior to the AFC control circuit 10 initiating switchover of the relay switches, the AFC control circuit 10 signals the PFC control circuit 20 to turn OFF the main switch 38 in the PFC converter 18.

Figure 3:
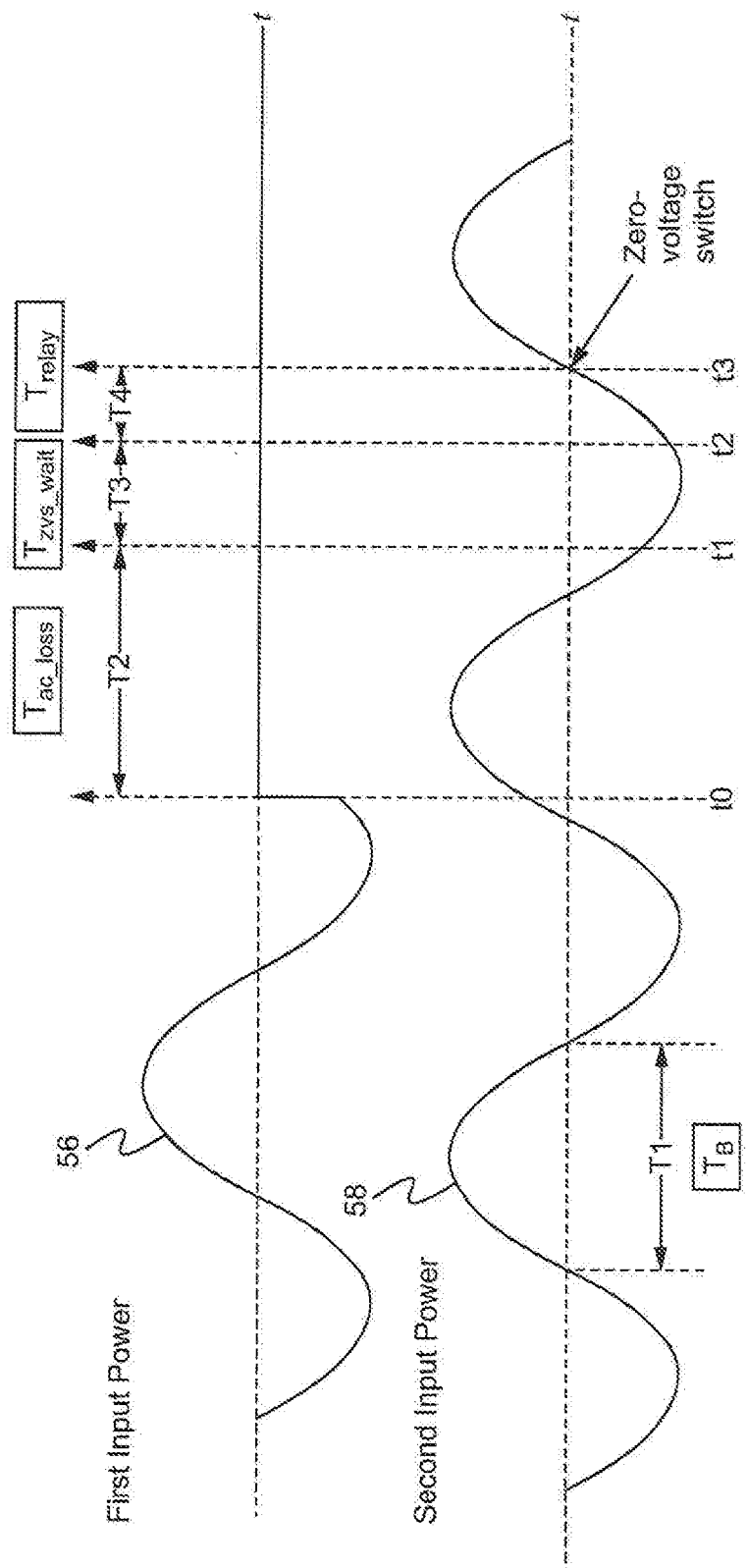
FIG. 3 illustrates an exemplary control timing diagram for implementing switchover according to some embodiments.

In operation, the power converter with AFC 2 is configured to determine when an interruption in the first input power 4 necessitates a switchover to the second input power 6, and precise timing and control of the switchover is determined and implemented. FIG. 3 illustrates an exemplary control timing diagram for implementing switchover according to some embodiments. A voltage curve 56 shows the sensed voltage level from the first input power 4, and a voltage curve 58 shows the sensed voltage level from the second input power 6. Under normal operating conditions, the relay switches 32, 34 are connected to the first power input 4. The voltage sensing circuit 8 and the AFC control circuit 10 are configured to sense and detect the amplitude and phase of both the first input power 4 and the second input power 6. When the voltage level of the sensed first input power 4 is lost, e.g. the sensed voltage level is zero for some period of time, then it is determined that an interruption in the first power input has occurred. Time t0 indicates when the first input power 4 is lost, as sensed and detected by the voltage sensing circuit 8 and the AFC control circuit 10. Time period Tac_loss (T2) is a waiting period to determine if the first input power 4 is truly lost or if it is only temporarily disrupted, such as by noise or other causes. Time period T2 is referred to as a trigger delay. If a time period T2 elapses without return of the first power input, then it is determined that a switchover is to be performed. Time period T2 is a predetermined, known value. A zero voltage switching algorithm is implemented by the AFC control circuit 10 to determine when exactly control signaling is sent to the relay switches to switchover.

Time period T1 is the time period between zero voltage crossings of the second input power 6. Time period T1 is calculated by the AFC control circuit 10 determined from having previously sensed the second input power 6. Time period Tzvs_wait (T3) is the time waiting for the correct phase of the second input power 6, i.e. for the next zero voltage crossing of the second input power 6. Since the second input power 6 is being sensed and detected, the most recent zero voltage crossing of the second input power 6 is known and the subsequent zero voltage crossing can be calculated by the AFC control circuit 10 according to T1.

Time period Trelay (T4) is the mechanical delay of the relay switches 32, 34, i.e. the time delay for the switching arm to physically switch terminals after receiving the switchover control signal from the AFC control circuit 10. Since the relay switches 32, 34 are mechanical, there is a delay between signaling the relay switches to switchover and the actual mechanical switching of the switching arm from one terminal to another. When the switching arm is changed from one terminal to the other terminal, the switching arm physically bounces, or oscillates, against the other terminal before settling into constant contact with the other terminal. Time period T4 takes into account the time period that the switching arm oscillates before settling onto the terminal. Time period T4 is a predetermined, known value.

In this way, the timing for transmission of the control signal by the AFC control circuit 10 to the relay switches 32, 34 is established by determining when the next zero voltage crossing for the second input power 6 and then transmitting the control signal at time t2, which is a time period T4 before the anticipated timing of the next zero voltage crossing of the second input power 6 at time t3. Prior to time t3, the AFC control circuit 10 transmits a control signal to the PFC control circuit 20 indicating that the main switch 38 in the PFC power converter 18 is to be turned OFF. In turn, the PFC control circuit 20 transmits a control signal to the main switch 38 to turn OFF such that there is zero current in the third current path at time t3, the time of switchover. It is understood that the voltage waveforms, absolute time periods, and relative duration of time periods shown in FIG. 3 are for exemplary purposes only and that the specific values are application specific.

Figure 4:
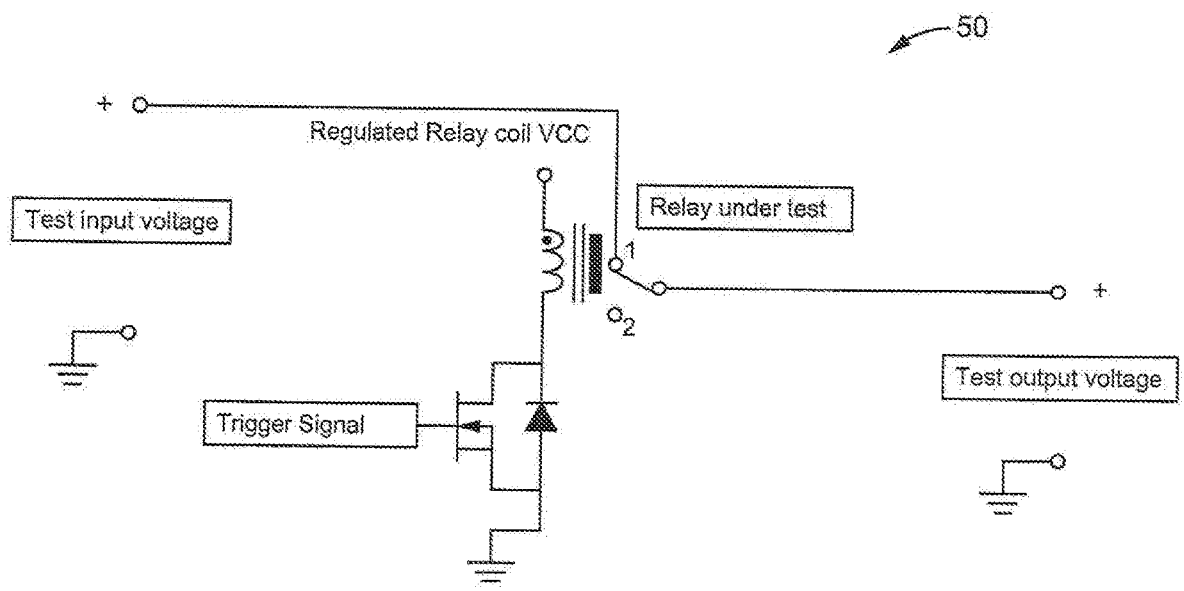
FIG. 4 illustrates an exemplary calibration circuit for determining the relay switch delay time period according to some embodiments.

As previously described, the time period T4 (Trelay) is a predetermined value. In the case of a magnetic relay switch, each relay switch depends on the current through the inductor coil. The greater the current, the larger the induced magnetic field, and the faster the switchover of the switching arm from the first terminal to the second terminal. As such, the value of time period Trelay is a function of the voltage level applied to the relay switch. A calibration circuit 50 shown in FIG. 4 can be used to predetermine the value of time period Trelay for a given applied voltage that is to be used in operation to control the relay switches 32, 34 (FIG. 2). In general, a time period Trelay is predetermined for a given voltage applied to the relay switch for switchover. Time period Trelay can be determined during a calibration step, such as during production, using the calibration circuit 50.

Figure 5:
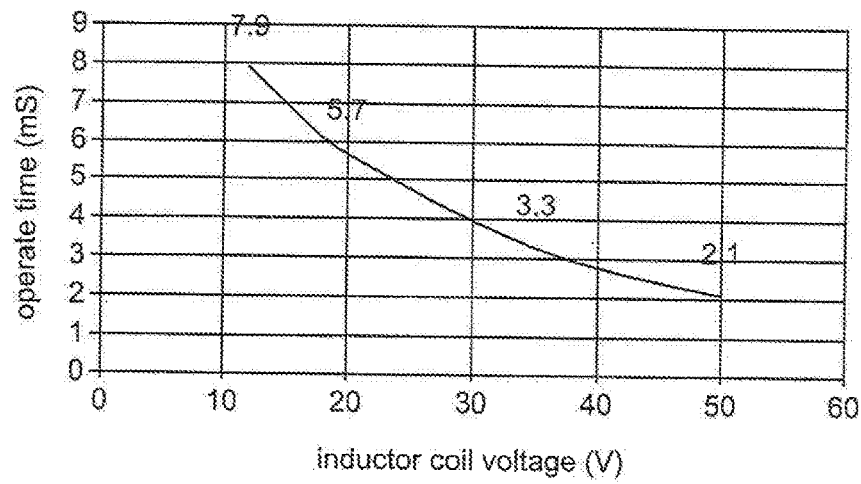
FIG. 5 illustrates an exemplary relationship between inductor coil voltage and relay switching time T4.

The following provides a typical timing example. The AC loss detect time (T2) can be achieved in less than 4 ms. The zero voltage switching wait time (T3) for the next zero voltage crossing is dependent on when the first input power 4 is lost relative to the most recent previous zero voltage crossing of the second input power 6 at the time of the lost first input power 4. Worst case is that the zero voltage switching wait time T3 is equal to the time period T1, which is the time period between zero voltage crossing for the second input power 6. The relay switching time (T4) can be achieved in less than 4 ms with high applied voltage. For example, using a 35V inductor coil voltage, a 3.3 ms relay switching time T4 can be achieved. An exemplary relationship between inductor coil voltage and relay switching time T4 is shown in FIG. 5. It is understood that different relay switches may behave differently and have different inductor coil voltage to relay switching time T4 relationships.

A typical power converter has a 20 ms hold out time, meaning that if the input power is lost for 20 ms or less, the output voltage Vout will not be adversely affected (due to the charge stored in the bulk capacitor 48) and the operation will not be impacted. In this case, there is up to 12 ms for the zero voltage switching wait time T3 before operation of the power converter is affected. If the example second input power has a range 180-264 VAC and frequency of 47-63 Hz, then the worst case scenario for the whole period of the second input power is 21 ms, and since time period T1 is one-half the whole period, the worst case for time period T1 is 10.5 ms. So the overall time (T2+T3+T4) for implementing the AFC control timing for switchover, with the worst case scenario for T3, is 4 ms+10.5 ms+4 ms=18.5 ms, which is less than the 20 ms maximum delay for maintaining operation of the power converter in the event of lost first input power 4.

The present application has been described in terms of specific embodiments incorporating details to facilitate the understanding of the principles of construction and operation of the relay switchover control. Many of the components shown and described in the various figures can be interchanged to achieve the results necessary, and this description should be read to encompass such interchange as well. As such, references herein to specific embodiments and details thereof are not intended to limit the scope of the claims appended hereto. It will be apparent to those skilled in the art that modifications can be made to the embodiments chosen for illustration without departing from the spirit and scope of the application.

What is claimed is:

1. A power supply and power converter system, the system comprising:
   a. a first input AC power supply;
   b. a second input AC power supply;
   c. a relay switchover circuit coupled to the first input AC power supply and the second input AC power supply, wherein under normal operating conditions the relay switchover circuit is configured to enable connection with the first input AC power supply and disable connection from the second input AC power supply;
   d. a power conversion circuit coupled to the relay switchover circuit;
   e. a voltage sensing circuit coupled to the first input AC power supply and the second input AC power supply; and
   f. a control circuit coupled to the voltage sensing circuit, the relay switchover circuit, and the power conversion circuit, wherein the control circuit is configured to receive sensed voltage levels of the first input AC power supply and the second input AC power supply, to determine if the first input AC power supply is interrupted and switchover to the second input AC power supply is required by determining if the sensed voltage value of the first input AC power supply is zero for a predetermined waiting period, and to control switchover of the relay switchover circuit to disable connection with the first input AC power supply and enable connection with the second input AC power supply at a zero voltage crossing of the sensed voltage level of the second input AC power supply, wherein the control circuit is configured to control switchover of the relay switchover circuit by calculating a next zero voltage crossing time of the second input AC power supply immediately following the predetermined waiting period, and then transmitting a control signal to the relay switchover circuit at a time equal to the calculated next zero voltage crossing time minus a predetermined switching delay time period.

2. The system of claim 1 wherein the power conversion circuit comprises a main switch, and the control circuit is configured to transmit a control signal to the main switch such that the main switch is OFF at the zero voltage crossing.

3. The system of claim 1 wherein the power conversion circuit comprises a power factor correction (PFC) power converter.

4. The system of claim 3 wherein the power conversion circuit further comprises a DC-to-DC converter coupled to an output of the PFC power converter.

5. The system of claim 3 wherein the PFC power converter is a boost converter.

6. The system of claim 3 wherein the control circuit comprises a first control circuit for providing control signals to the relay switchover circuit and a second control circuit for providing control signals to the PFC power converter, wherein the system further comprises an isolation barrier between the first control circuit and the second control circuit.

7. The system of claim 6 wherein the first control circuit is configured to provide control signals to the second control circuit through the isolation barrier.

8. The system of claim 1 wherein the control circuit is further configured to transmit a second control signal to a main switch of the power conversion circuit prior to the next zero voltage crossing time, wherein the second control signal turns OFF the main switch such that the main switch is OFF at the switchover of the relay switchover circuit.

9. A method of switching over power supplies for a power converter, the method comprising:
   a. coupling a first input AC power supply and a second input AC power supply to a relay switchover circuit, wherein under normal operating conditions the relay switchover circuit is configured to enable connection of the first input AC power supply to a power conversion circuit and disable connection of the second input AC power supply to the power conversion circuit;
   b. sensing a voltage level of the first input AC power supply and the second input AC power supply;
   c. determining if the first input AC power supply is interrupted and switchover to the second input AC power supply is required by determining if the sensed voltage value of the first input AC power supply is zero for a predetermined waiting period; and
   d. controlling switchover of the relay switchover circuit to disable connection with the first input AC power supply and enable connection with the second input AC power supply at a zero voltage crossing of the sensed voltage level of the second input AC power supply, wherein controlling switchover of the relay switchover circuit comprises calculating a next zero voltage crossing time of the second input AC power supply immediately following the predetermined waiting period, and then transmitting a control signal to the relay switchover circuit at a time equal to the calculated next zero voltage crossing time minus a predetermined switching delay time period.

10. The method of claim 9 wherein the power conversion circuit comprises a main switch, and the method further comprises transmitting a control signal to the main switch such that the main switch is OFF at the zero voltage crossing.

11. The method of claim 9 wherein the method further comprises transmitting a second control signal to a main switch of the power conversion circuit prior to the next zero voltage crossing time, wherein the second control signal turns OFF the main switch such that the main switch is OFF at the switchover of the relay switchover circuit.

* * * * *